(No Model.) 2 Sheets—Sheet 1.

H. LOTH.
CHAMBER POT OR COMMODE.

No. 288,824. Patented Nov. 20, 1883.

WITNESSES:
Will H. Powell.
G. Connolly.

INVENTOR
Henry Loth,
By Connolly Bros.,
ATTORNEYS (No Model.) 2 Sheets—Sheet 2.

H. LOTH.
CHAMBER POT OR COMMODE.

No. 288,824. Patented Nov. 20, 1883.

WITNESSES:

INVENTOR
Henry Loth
By Connolly Bro.,
ATTORNEY

UNITED STATES PATENT OFFICE.

HENRY LOTH, OF PHILADELPHIA, PENNSYLVANIA.

CHAMBER-POT OR COMMODE.

SPECIFICATION forming part of Letters Patent No. 288,824, dated November 20, 1883.

Application filed July 21, 1882. (No model.)

*To all whom it may concern:*

Be it known that I, HENRY LOTH, a citizen of the United States, residing at Philadelphia, in the county of Philadelphia and State of Pennsylvania, have invented certain new and useful Improvements in Chamber-Pots or Commodes; and I do hereby declare the following to be a full, clear, and exact description of the invention, reference being had to the accompanying drawings, which form part of this specification, in which—

Figure 1:
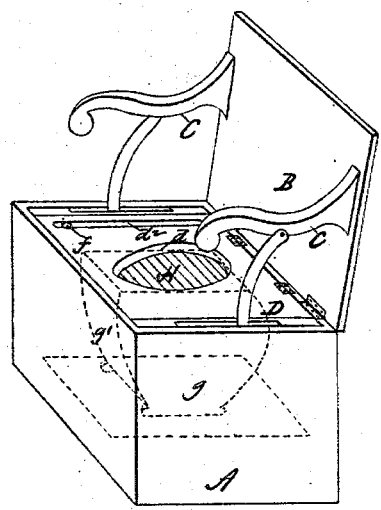
Figure 2:
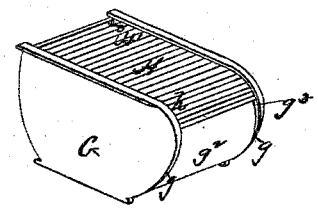
Figure 3:
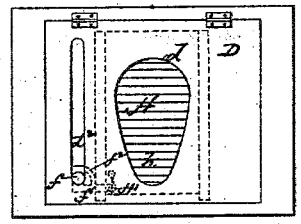
Figure 4:
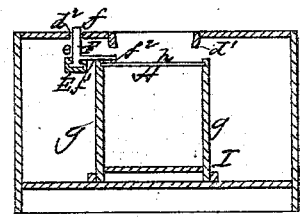

Figure 1 is a perspective showing commode-lid lifted and pot covered. Fig. 2 is a perspective of pot alone with cover closed. Fig. 3 is a plan of commode-seat with pot in position. Fig. 4 is a vertical transverse section through commode and pot.

My invention has relation to commodes, and has for its object to provide means whereby the pot may be covered while the commode is occupied, so as to avoid the escape of smell when the occupant rises from the seat and while the pot is being removed and carried away to be emptied.

My invention has for its further object to provide a construction for the purpose aforesaid which shall keep the operative parts within the commode-body and avoid all external projection of such parts beyond said body.

My improvements consist in the peculiar construction and combinations of parts hereinafter fully set forth, having reference principally to the following points: first, to the construction of the pot with curved ways for the reception of a sliding cover; second, to the combination, with the pot, of a sliding cover adapted to move in curved ways in the body of the pot, and so arranged and operating that said cover shall always be confined to and within said pot or between the walls thereof, whether the hole or mouth of the pot be covered or uncovered; third, to the combination of the pot and its sliding cover with a slide which is movable in a guide within the commode-body and provided with a detachable connection for said cover, whereby the latter may be moved by means of said slide, and disconnected from the latter whenever it is desired to remove the pot from the commode for emptying or cleaning purposes.

Referring to the accompanying drawings, A represents a commode-body, of any suitable or desired construction, having preferably a hinged lid, B, with supporting-arms C, and having also a hinged seat, D, with opening or hole $d$.

Depending from the under side of the seat, around the edge of the hole $d$, is a flange, $d'$. Below the seat D is a rigid bar, E, fixedly sustained between the front and rear sides of the commode-body. Said bar has a longitudinal groove, $e$, which receives a slide, F. Said slide has a knob or handle, $f$, which projects upwardly through an elongated slot, $d^2$, in the seat D.

Projecting laterally from the slide F, and, if desired, made integral therewith, is an arm, $f'$, provided, preferably, with a brace, $f^2$, and having a stud, button, or eye, $f^3$, for the engagement of a swing-hook on the pot-cover.

G represents the pot, which is preferably of the peculiar shape shown, having straight parallel sides $g$ $g$, and curved front and back walls, $g'$ $g^2$, respectively. The side walls have each a groove, $g^3$ $g^3$, extending parallel with the top edge, curving at the back, and descending downwardly toward the bottom, as shown.

H is a sliding cover, having its edge fitted in the grooves $g^3$ $g^3$, so as to move therein, as in ways or guides. The cover H is flexible, being composed of a sheet of canvas, rubber, or other flexible material, with transverse strips $h$, of wood, metal, or other rigid material. This cover may be readily moved in the grooves $g^3$ $g^3$, so as to cover and uncover the pot. When acting as a cover, it occupies the horizontal part of the grooves and a portion of the rear curve. When slid back to uncover, it descends into the back portion of said grooves, clearing the horizontal part of the latter; but in each position it is confined wholly within the walls of the pot, and never projects beyond the same.

H' represents a swinging hook or latch (for which any equivalent fastening may be substituted) attached to the cover, and adapted to be moved into engagement with the stud $f^3$ on the slide F.

The operation is as follows: The pot being placed within the commode-body, the hook H' is engaged with the stud $f^3$ of the arm $f'$ of slide F. Now, on moving said slide forward and back in the slot $d^2$, the cover H will be caused to cover and uncover the pot. The occupant of the seat, before rising therefrom, moves the slide forwardly, thereby covering the pot and preventing the escape of smells therefrom. The pot may then be removed by swinging back the hook H' out of engagement with the stud $f^2$, and lifting the seat D. The cover remaining over the pot, the latter is kept closed while being carried off to be emptied.

To steady the pot in the commode-body, the latter has a seat or socket, I, for the reception of the pot-foot, formed by securing cleats to the bottom of said body.

It will be noted that the operative parts are wholly internal, and that whether the commode be opened or closed there are no projections to interfere with its symmetry or to militate against its stowage or transportation.

The pot is mainly intended for employment in connection with a commode, but may be advantageously used independently thereof; hence my claim of invention, as relates to the pot, is not limited to its combination with a commode.

What I claim as my invention is—

1. In combination with commode-body A and cover H, the bar E and slide F, located within said body, substantially as shown and described.

2. In combination with the slide F, having a knob or handle, $f$, the seat D, having a slot, $d^2$, for the passage of said knob or handle, and bar E, substantially as shown and described.

3. A commode-pot having front, rear, and side walls, the side walls having grooves which extend parallel with the top edge of said side walls and downwardly back or outside of the rear wall, and a flexible cover fitted and adapted to move in said grooves, substantially as shown and described.

4. The combination of slide F, bar E, and stud $f^2$, with cover H, having swinging hook H', substantially as shown and set forth.

In testimony that I claim the foregoing I have hereunto set my hand this 19th day of July, 1882.

HENRY LOTH.

Witnesses:
 JOS. A. ABRAMS,
 JOS. L. GREENWALD.